United States Patent
Reumann et al.

(10) Patent No.: US 8,381,209 B2
(45) Date of Patent: Feb. 19, 2013

(54) MOVEABLE ACCESS CONTROL LIST (ACL) MECHANISMS FOR HYPERVISORS AND VIRTUAL MACHINES AND VIRTUAL PORT FIREWALLS

(75) Inventors: John Reumann, Croton on Hudson, NY (US); Debanjan Saha, Mohegan Lake, NY (US); Sambit Sahu, Hopewell Junction, NY (US); Dinesh Chandra Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1429 days.

(21) Appl. No.: 11/619,536

(22) Filed: Jan. 3, 2007

(65) Prior Publication Data

US 2008/0163207 A1 Jul. 3, 2008

(51) Int. Cl.
*G06F 9/455* (2006.01)
(52) U.S. Cl. .............. 718/1; 709/250; 718/102
(58) Field of Classification Search .......... 709/250; 718/1, 102
See application file for complete search history.

(56) References Cited

U.S. PATENT DOCUMENTS

| | | | |
|---|---|---|---|
| 5,386,552 A | 1/1995 | Garney | |
| 6,496,847 B1 | 12/2002 | Bugnion et al. | |
| 6,691,146 B1 | 2/2004 | Armstrong et al. | |
| 6,795,966 B1 | 9/2004 | Lim et al. | |
| 2004/0015966 A1 | 1/2004 | MacChiano et al. | |
| 2004/0158720 A1 | 8/2004 | O'Brien | |
| 2006/0136653 A1* | 6/2006 | Traut et al. | 711/6 |
| 2006/0143311 A1* | 6/2006 | Madukkarumukumana et al. | 710/1 |
| 2006/0236127 A1* | 10/2006 | Kurien et al. | 713/193 |
| 2008/0034234 A1* | 2/2008 | Shimizu et al. | 713/320 |
| 2008/0244569 A1* | 10/2008 | Challener et al. | 718/1 |
| 2009/0025007 A1* | 1/2009 | Hara et al. | 718/105 |
| 2009/0119684 A1* | 5/2009 | Mahalingam et al. | 719/324 |
| 2009/0129385 A1* | 5/2009 | Wray et al. | 370/392 |
| 2009/0249438 A1* | 10/2009 | Litvin et al. | 726/1 |
| 2009/0296726 A1* | 12/2009 | Snively et al. | 370/401 |
| 2009/0328074 A1* | 12/2009 | Oshins | 719/321 |

* cited by examiner

*Primary Examiner* — Mohamed Wasel
(74) *Attorney, Agent, or Firm* — Eustus D. Nelson, Esq.; McGinn IP Law Group, PLLC

(57) ABSTRACT

A method (and system) which provides virtual machine migration with filtered network connectivity and control of network security of a virtual machine by enforcing network security and routing at a hypervisor layer at which the virtual machine partition is executed, and which is independent of guest operating systems.

17 Claims, 18 Drawing Sheets

US 8,381,209 B2

MOVEABLE ACCESS CONTROL LIST (ACL) MECHANISMS FOR HYPERVISORS AND VIRTUAL MACHINES AND VIRTUAL PORT FIREWALLS

BACKGROUND OF THE INVENTION

1. Field of the Invention

The present invention generally relates to a method and system for providing control of network security of a virtual machine, and more particularly, to a method of virtual machine migration with filtered network connectivity which includes enforcing network security and routing at a hypervisor layer at which a virtual machine partition is executed and which is independent of guest operating systems.

2. Description of the Related Art

In a network-secured environment, host movement means moving its network entangled state, which includes routing (e.g., VLAN (virtual local area network) tags, OSPF (open shortest-path first) host route entries, etc.) and security (e.g., firewall (FW) access control lists (ACLs), switch ACLs, router ACLs, VLAN tags, etc.) from one machine to another.

That is, in order to perform maintenance on or provide a fail-over for a processor device or machine, it is desirable to move or migrate a virtual machine (VM) from one processor machine or device to another processor machine or device.

For purposes of this disclosure, a virtual machine (VM) generally includes a virtual data processing system, in which multiple operating systems and programs can be run by the computer at the same time. Each user appears to have an independent computer with its own input and output devices.

For purposes of this disclosure, logical partitioning (LPAR) generally means the capability to divide a single physical system into multiple logical or "virtual" systems, each sharing a portion of the server's hardware resources (such as processors, memory and input/output (I/O)). Each LPAR runs an independent copy of an operating system. They can even be different operating system versions or distributions.

That is, LPAR generally allows customers to "slice-up" a machine into virtual partitions, and provides the flexibility to dynamically change the allocation of system resources for those environments, thereby providing the capability to create multiple virtual partitions within a processor. Spare capacity can be re-allocated to virtual partitions. Any of the virtual servers may run on any of the physical processors, meaning that the processor resources are fully shared, which makes it possible to run the physical server at very high utilization levels.

For purposes of this disclosure, dynamic logical partitioning (DLPAR) generally increases flexibility, enabling selected system resources like processors, memory and I/O components to be added and deleted from dedicated partitions while they are actively in use. The ability to reconfigure dynamic LPARs enables system administrators to dynamically redefine all available system resources to enable optimum capacity for each partition.

For purposes of this disclosure, virtual local area network (VLAN or virtual LAN) generally allows clients to create virtual Ethernet connections to provide high-speed inter-partition communication between logical partitions on a server without the need for network I/O adapters and switches. Connectivity outside of the server can be achieved using the virtual I/O server partition that acts as an internet protocol (IP) forwarder to the Local Area Network (LAN) through an Ethernet I/O adapter.

For purposes of this disclosure, a hypervisor, sometimes referred to as a virtualization manager, includes a program that allows multiple operating systems, which can include different operating systems or multiple instances of the same operating system, to share a single hardware processor. A hypervisor preferably can be designed for a particular processor architecture.

Each operating system appears to have the processor, memory, and other resources all to itself. However, the hypervisor actually controls the real processor and its resources, allocating what is needed to each operating system in turn.

Because an operating system is often used to run a particular application or set of applications in a dedicated hardware server, the use of a hypervisor preferably can make it possible to run multiple operating systems (and their applications) in a single server, reducing overall hardware costs. Production and test systems also preferably can run at the same time in the same hardware. In addition, different operating systems preferably can share the same server.

Thus, a hypervisor generally means a scheme which allows multiple operating systems to run, unmodified, on a host computer at the same time. Such software lets multiple operating systems run on the same computer, a feature that is particularly useful for consolidating servers in order to save money, and for extracting as much work as possible from a single system.

As mentioned above, in order to perform maintenance on or provide a fail-over for a processor device or machine, it is desirable to move or migrate a virtual machine (VM) from one processor machine or device to another processor machine or device.

With reference to FIGS. 1-3, conventional approaches to migrating virtual machines from one device (e.g., hardware device) to another device (e.g., hardware device) will be described.

FIG. 1 illustrates an exemplary system 100 which can include a plurality of virtual machines (VM) (101) controlled by a switches (e.g., SWA1-SWB5) (102) connected by an Internet Service Provider (ISP) (103) and protected by firewalls FW1 and FW2 (104).

As mentioned above, in a network-secured environment, host movement means moving its network entangled state, which includes routing and security from one machine to another.

In FIG. 2, the network entangled state of virtual machine VM 205 (e.g., hypervisor 206; NIC1 207, VNIC 210, switch1 208, and firewall FW1 209) is copied to virtual machine VM' 215 (e.g., hypervisor 216; NIC2 217, VNIC (virtual network interface card) 210, switch2 218, and firewall FW2 219). In FIG. 2, there is no ACL at switch2 (318), which means every virtual machine could be masqueraded. Also, at the firewall FW2 (219), there is no selection of which virtual machine can go where.

As illustrated in FIG. 2, conventional systems (e.g., 200) generally do not include ACLs. Also, the firewall FW2 does not include a selection of which virtual machine can be accessed. Thus, the conventional systems provide very little security and routing generally is provided by OSPF advertised host routes.

FIG. 3 illustrates another conventional system in which routing is taken care of by OSPF advertised host routes. FIG. 3 illustrates a conventional system in which restrictive ACLs are included in the switch2 and the firewall FW2 includes restrictions for access.

In FIG. 3, the network entangled state of virtual machine VM 305 (e.g., hypervisor 306; NIC1 307, VNIC 310, switch1 308, and firewall FW1 309) is copied to virtual machine VM'

315 (e.g., hypervisor 316; NIC2 317, VNIC 310, switch2 318, and firewall FW2 319). As illustrated in FIG. 3, in the conventional systems, the restrictive ACLs are provided, for example, at switch2 (318). The firewall FW2 also includes restrictions.

Thus, the conventional systems and methods require a complex update scheme to update the ACLs in the real switches and the filters in the firewalls to migrate a virtual machine from one machine to another machine.

Generally, conventional virtual machine systems and methods provide very little network security. In the conventional systems and methods, routing generally is provided by open shortest-path first (OSPF) advertised host routes. Conventional systems and methods generally do not include access control lists (ACLs) and security generally is only as good as security at each individual machine.

For example, one conventional system and method relates to virtualizing computer systems on the same host practical. Some conventional methods relate to arbitration of access to shared resources on the same host when multiple operating systems attempt to access the shared resource. In particular, one conventional method focuses on the ability to virtualize shared memory page tables, which to date had not been successfully addressed in direct execution virtual machines. The conventional method does not, however, address network virtualization, in which a virtual machine is to be network addressable, which is addressed herein below by the present invention. Instead, the conventional method merely relates to a virtual machine that is addressable but that does not migrate its network-entangled state.

Another exemplary method and device relates to a mechanism for restoring, porting, replicating and check pointing computer systems using state extraction. This conventional method covers the ability to initiate migration of a virtual machine from one system to another. Particularly, the conventional method and device discusses the migration of peripheral state in which the peripheral is assumed to be a hardware resource that is emulated. However, such conventional methods and devices do not discuss the much more flexible and efficient possibility of capturing application state, such as the state of a firewall or routing that pertains to a particular movable partition, which is addressed herein below by the present invention. Instead, these conventional methods and devices merely focus on device control, which, as the ordinarily skilled artisan would know and understand, is not the same as (or equivalent to) the establishment of logical rules that govern the interaction of a migrated virtual machine with the rest of the network infrastructure, as described herein below by the present invention. These conventional methods and devices also do not disclose or suggest, however, that a logical device needs to be bootstrapped and/or that device state in the network needs to be revoked upon migration of a virtual machine partition, as described herein below by the present invention Other conventional systems and methods relate to a logical partition manager. These methods discuss the possibility of feeding information that is created within a logical partition (guest, or virtual machine) back to a partition manager. These conventional methods discuss the operating system (OS) itself applying security controls and routing in a special partition. The crux of these conventional methods is so-called paravirtualization.

In paravirtualization, the partition manager "trusts" the partition OS to cooperate with the other partitions. These conventional systems suffer from a serious security flaw that an undermined OS can disable access protection that prevents remote control software from manipulating an operating system instance running within a logical partition (guest or virtual machine). These conventional methods, therefore, cannot be used to implement access controls unless additional security inventions secure the shared state and control across partitions in reliable manner. These conventional methods do not discuss how the network access controls may have to be reset on copying a virtual machine from one computer to another, which is addressed herein below by the present invention. These conventional methods also do not discuss how network access control and routing is to be maintained.

Other conventional systems and methods relate to virtual machine operating system local area networks (LANs), and describe a system for defining and creating virtual network adapters within a hypervisor for the use by guest virtual machines. These conventional systems and methods do not discuss access controls and routing problems pertaining to a virtual machine being copied across the network, which are addressed and solved herein below by the present invention.

Other conventional systems and methods relate to preservation of a computer system processing state in a mass storage device. These conventional systems and methods describe how the state of a computer should be stored in a mass storage device. These conventional systems and methods do not describe how the storage should be extended to also capture state that is external to the processor's addressable memory, which is addressed herein below by the present invention.

SUMMARY OF THE INVENTION

In view of the foregoing and other exemplary problems, drawbacks, and disadvantages of the conventional methods and systems, an exemplary feature of the present invention is to provide a method and system for providing control of network security of a virtual machine, and more particularly, to a method of virtual machine migration with filtered network connectivity which includes enforcing network security and routing at a hypervisor layer at which a virtual machine partition is executed and which is independent of guest operating systems.

As mentioned above, in order to perform maintenance on or provide a fail-over for a processor device or machine, it is desirable to move or migrate a virtual machine (VM) from one processor machine or device to another processor machine or device. However, conventional systems and methods require a complex scheme to update and install ACLs in the real switches of the machines and update and install firewalls. Also, the conventional systems and methods provide very little security.

The exemplary method and system of the present invention can provide control of network security of a virtual machine by enforcing network security and routing at a hypervisor layer at which a virtual machine partition is executed and which is independent of guest operating systems.

The exemplary aspects of the present application preferably can provide a hypervisor security architecture designed and developed to provide a secure foundation for server platforms, providing numerous beneficial functions, such as, strong isolation, mediated sharing and communication between virtual machines. These properties can all be strictly controlled by a flexible access control enforcement engine, which also can enforce mandatory policies.

The exemplary features of the invention also can provide attestation and integrity guarantees for the hypervisor and its virtual machines.

For example, the present invention exemplarily defines a computer implemented method of controlling network security of a virtual machine, including enforcing network security and routing at a hypervisor layer.

Particularly, the present invention defines a computer implemented method of virtual machine migration with filtered network connectivity, including enforcing network security and routing at a hypervisor layer which is independent of guest operating systems.

The exemplary method of the present invention can include, for example, copying network security and routing for the virtual machine to the hypervisor layer, migrating the virtual machine from a first hardware device to a second hardware device, updating routing controls for the virtual machine at the hypervisor level, updating traffic filters for the virtual machine at the hypervisor level, and advertising the migration of the virtual machine from the first hardware device to the second hardware device.

On the other hand, an exemplary system for controlling network security of a virtual machine by enforcing network security and routing at a hypervisor layer, according to the present invention, includes a copying unit that copies network security and routing for the virtual machine to the hypervisor layer, a migrating unit that migrates the virtual machine from a first hardware device to a second hardware device, a first updating unit that updates routing controls for the virtual machine at the hypervisor level, a second updating unit that updates traffic filters for the virtual machine at the hypervisor level, and an advertising unit that advertises the migration of the virtual machine from the first hardware device to the second hardware device.

As mentioned above, in the conventional methods and systems, it is difficult to move one virtual machine from one machine to another. Generally, in conventional systems, to move a virtual machine from one machine to another (e.g., from hardware 1 to hardware 2), the conventional methods and systems would merely shut down and copy from hardware 1 to hardware 2. The conventional systems and methods have difficulties with security and routing.

To solve the problems with the conventional systems and methods, the present invention copies security and routing, etc. for the virtual machine to the hypervisor layer so that the user will see no difference in operation between running the virtual machine on hardware 1 or hardware 2. That is, according to the present invention, the first and second device (e.g., hardware 1 and hardware 2) would each act the same, and preferably, would each have the same internet protocol (IP) address.

An important problem arises when networks are very large, such as Google and Yahoo, in which there could be a thousand servers, and no flat topography, switches and routers to protect the servers. That is, in such systems, the virtual system is run on top of the hypervisor such that each virtual system is only as good as the security at each machine.

To migrate the virtual machine from a first hardware device to a second hardware device, the present invention routes network traffic for the virtual machine to the second hardware device at the hypervisor layer. The present invention also sets firewalls to permit network traffic for the virtual machine to go to the second hardware device at the hypervisor layer.

According to the present invention, the hypervisor level provides traffic filtering and routing updating. Thus, the real switches do not need to be updated at the first and second hardware devices.

Moreover, the present invention advertises the migration of the virtual machine from the first hardware device to the second hardware device using the second hardware device. Thus, the present invention has an important advantage of not requiring central control. The routers also do not need to be updated because the migration is being advertised from the second hardware device (e.g., hardware 2).

The present invention decentralizes the updating scheme by using the hypervisor layer for security and routing. Thus, according to the present invention, preferably only two software components would be needed to be updated, whereas the conventional systems and methods would require all systems to be updated (e.g., routers, firewalls, etc.). The present invention also is more predictable than the conventional systems and methods.

Thus, the present invention has an important advantage over the conventional systems of pushing all security and intelligence to the hypervisor level, instead of the OS level. That way, under the protection of the hypervisor, the present invention can provide traffic filtering and routing updating.

The present invention also can provide secure boot or authenticated boot code guarantees for the hypervisor platform, virtual machines, and optionally the guest operating systems and applications running on virtual machines. The present invention can provide resource control and accurate accounting guarantees. All resources can be strictly accounted for and can be constrained. Simple resources include memory and CPU cycles.

The present invention can provide the base infrastructure for disaggregation of services, such as security policy management or distributed auditing, into smaller and more manageable protected execution environments, thereby enabling their system-wide utilization and potentially enhancing the assurance of these services.

The ordinarily skilled artisan would understand that an exemplary system can include dedicated and shared processors. That is, a hypervisor and virtual I/O server feature can dedicate processor resources to a single partition, so that it always has a defined amount of resources available. However, processor resources also can be added to a shared processor pool. Resources in the shared pool are available to any partition that needs them. Leveraging the power of a shared processor pool is a key ingredient to improving overall system utilization. Also, capped partitions generally have been given a maximum amount of processing power that they may consume out of the shared processor pool. On the other hand, uncapped partitions generally have been given the ability to use as much of the shared pool as they need.

The ordinarily skilled artisan also would understand that, unlike other virtualization techniques, hypervisor and virtual I/O server systems do not require all devices to be virtualized. That is, devices can be a mixture of dedicated devices assigned to partitions for maximum performance, or used in the virtual I/O hosting partition to be shared by multiple partitions to provide higher efficiency of resources and adapters.

As mentioned above, virtual local area network (VLAN or virtual LAN) generally allows clients to create virtual Ethernet connections to provide high-speed inter-partition communication between logical partitions on a server without the need for network I/O adapters and switches.

VLAN generally provides opportunities for simplification and cost savings in the information technology (IT) infrastructure. Some important benefits of using virtualization technology include, for example, (1) the opportunity to reduce total cost of ownership and make better use of IT assets by significantly improving server utilization and sharing I/O resources, (2) improving business responsiveness and operational speed by dynamically reallocating resources to applications as needed-to better match changing business cycles or handle unexpected surge in demand, and (3) simplifying the management of IT infrastructure by making workloads independent of hardware resources, thereby enabling customers to make business-driven policies to deliver resources based on time, cost and service-level requirements.

By providing higher efficiencies for an IT environment, the present invention can improve costs for virtualization, virtualization functionality, and virtualization technologies to meet a client's requirements.

The present invention also can provide the ability to efficiently react to new application needs, rapidly deploy applications, and test new solutions without the problems associated with implementing new infrastructure.

BRIEF DESCRIPTION OF THE DRAWINGS

The foregoing and other exemplary purposes, aspects and advantages will be better understood from the following detailed description of an exemplary aspect of the invention with reference to the drawings, in which.

DETAILED DESCRIPTION OF EXEMPLARY ASPECTS OF THE INVENTION

Figure 1:
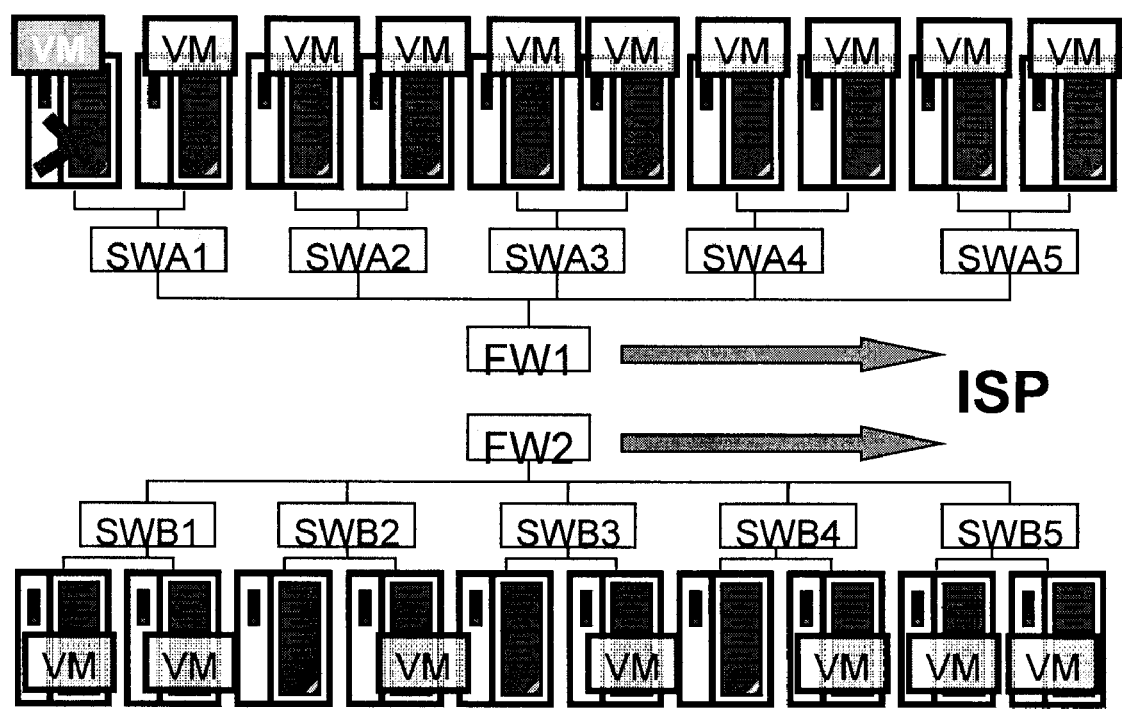
FIG. 1 illustrates an exemplary, system 100 according to the present invention.

Referring now to the drawings, and more particularly to FIGS. 4-19, there are shown exemplary aspects of the method and systems according to the present invention.

The unique and unobvious features of the exemplary aspects of the present invention are directed to a novel methods and systems for providing control of network security of a virtual machine, and more particularly, to a method of virtual machine migration with filtered network connectivity which includes enforcing network security and routing at a hypervisor layer at which a virtual machine partition is executed and which is independent of guest operating systems.

It is desirable to have a data center in which virtual execution platforms can be migrated from one machine to the next to facilitate seamless maintenance (e.g., machine maintenance, fail-over, etc.). That is, it is desirable for customers to provide their virtual machine images to a host. Such virtual machines images will be migrated "at will" to provide load balancing. Load balancing generally attempts to keep all virtual machines busy by allocating new tasks, or by moving existing tasks between virtual machines, according to some algorithm.

Figure 4:
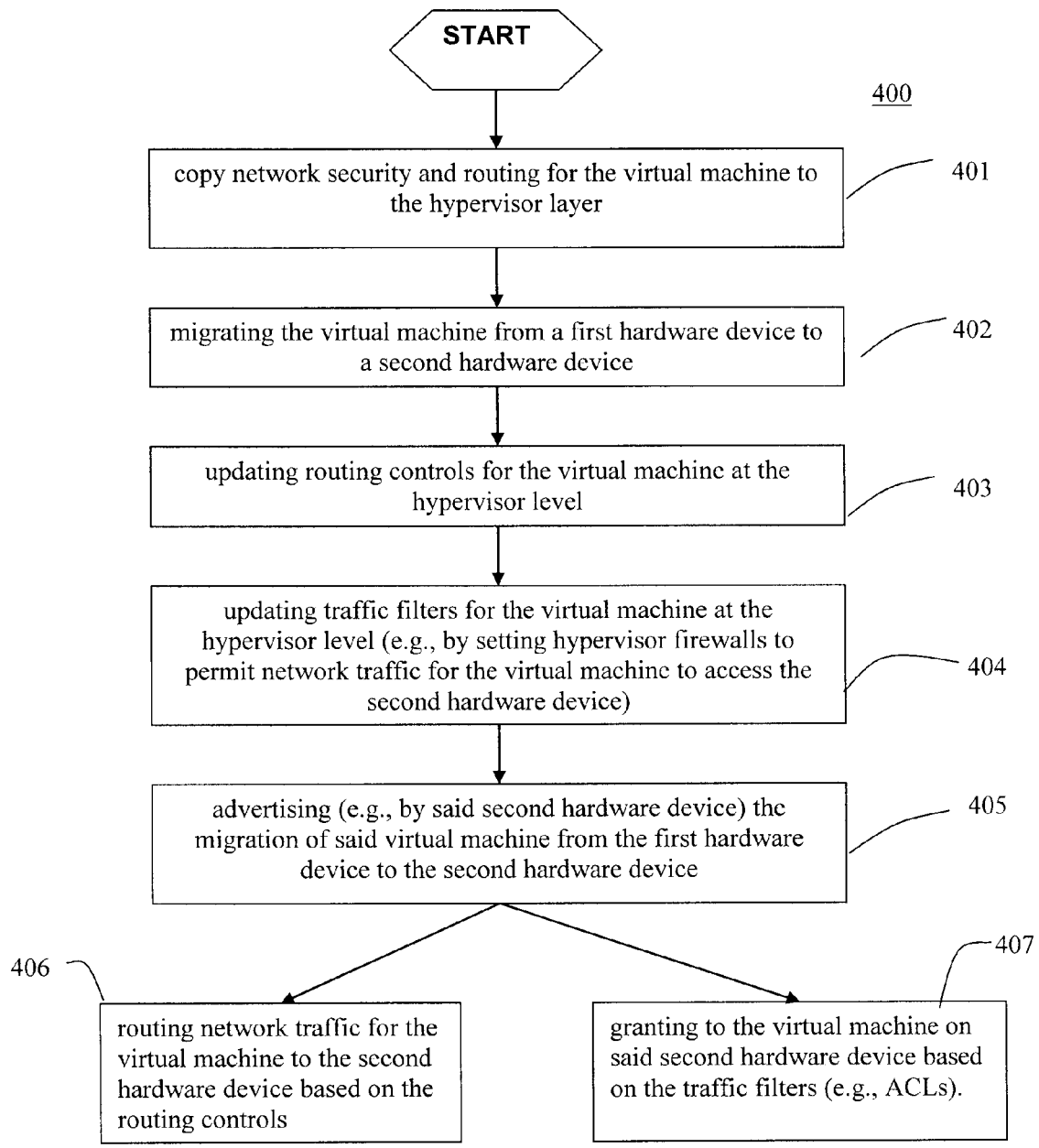
FIG. 4 illustrates an exemplary system 400, according to the present invention.

With reference to FIG. 4, an exemplary method according of the present invention includes a computer implemented method of securing a filtered network, including enforcing network security and routing at a hypervisor layer. Particularly, the exemplary method includes enforcing network security and routing at a hypervisor layer which is independent of guest operating systems. The exemplary method copies network security and routing for the virtual machine to the hypervisor layer (e.g., see 401), migrates the virtual machine from a first hardware device to a second hardware device (e.g., see 402), updates routing controls for the virtual machine at the hypervisor level (e.g., see 403), updates traffic filters for the virtual machine at the hypervisor level (e.g., see 404), and advertises the migration of the virtual machine from the first hardware device to the second hardware device (e.g., see 405).

Accordingly, the exemplary method then routs network traffic for the virtual machine to the second hardware device based on the routing controls (e.g., see 406) and/or grants access to the virtual machine on the second hardware device based on the traffic filters (e.g., see 407).

Preferably, updating the traffic filters includes setting hypervisor firewalls to permit network traffic for the virtual machine to access the second hardware device. Also, the advertising preferably is performed by the second hardware device.

According to the present invention, the virtual machine preferably can retain the same internet protocol address after the migrating.

As mentioned above, in the conventional methods and systems, it is difficult to move one virtual machine from one machine to another. Generally, in conventional systems, to move a virtual machine from one machine to another (e.g., from hardware 1 to hardware 2), the conventional methods and systems would merely shut down and copy from hardware 1 to hardware 2. The conventional systems and methods have difficulties with security and routing.

For example, in conventional systems, to migrate from one virtual machine (e.g., hardware 1) to another virtual machine (e.g., hardware 2), it is necessary to tell the network infrastructure that the image, for example, www.ibm5.com, is reachable at hardware 2 instead of hardware 1. Also, the router would need to be updated to route www.ibm5.com to hardware 2 instead of hardware 1. Similarly, the real switches and firewalls also would need to be updated to permit traffic that used to go to hardware 1 to go to hardware 2. Also, the service would need to be updated to allow MAC addresses.

Figure 2:
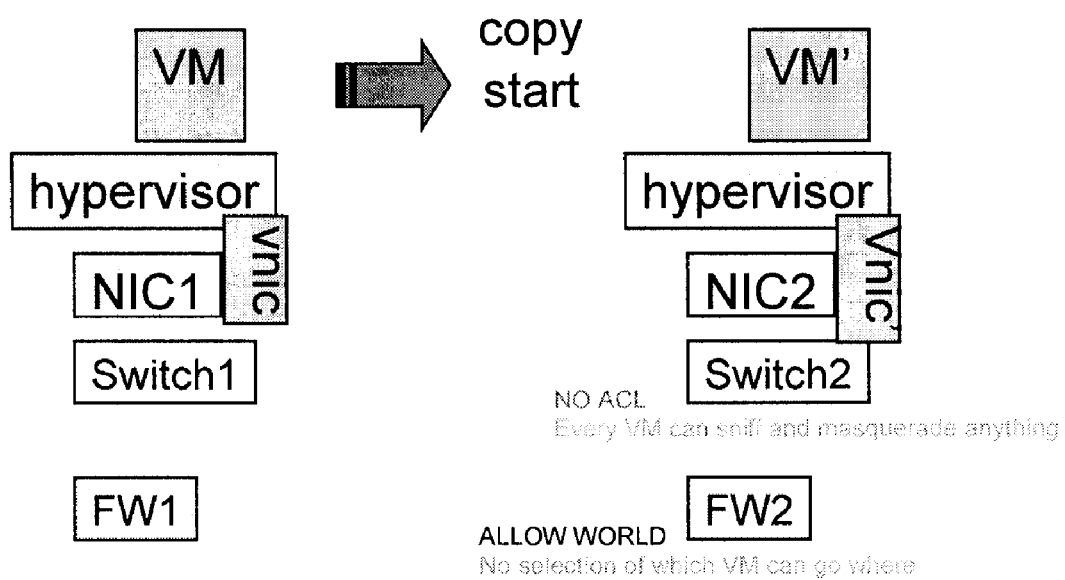
FIG. 2 illustrates a conventional system 200.
Figure 3:
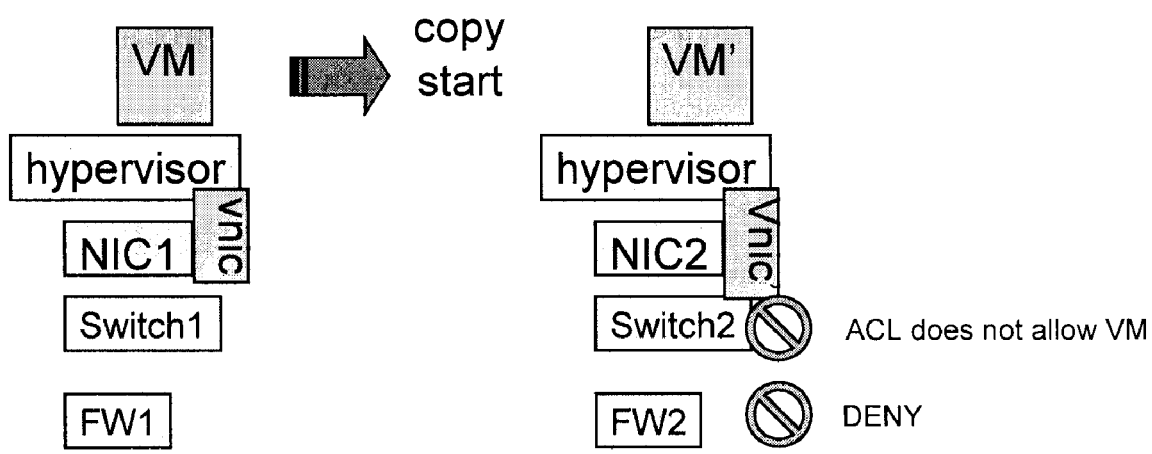
FIG. 3 illustrates a conventional system 300.

In such conventional systems, a central console generally would need to update switches, router, and firewall of hardware 2 to match the switches, router, and firewall of hardware 1. For example, a conventional system sets up permissions with restrictions (e.g., see FIG. 3). In such conventional systems (e.g., see FIGS. 2 and 3), security generally is only as good as each individual machine.

An important problem arises when networks are very large, such as Google and Yahoo, in which there could be a thousand servers, and no flat topography, switches and routers to protect the servers. That is, in such systems, the virtual system is run on top of the hypervisor such that each virtual system is only as good as the security at each machine.

To solve the problems with the conventional systems and methods, the present invention, for example, can copy security and routing, etc. to the hypervisor layer so that the user will see no difference in operation. That is, according to the present invention, the first and second device (e.g., hardware 1 and hardware 2) would each act the same, and preferably, would each have the same internet protocol (IP) address.

As described above with reference, for example, to FIG. 4, to migrate the virtual machine from a first hardware device to a second hardware device, the present invention routes network traffic for the virtual machine to the second hardware device at the hypervisor layer. The present invention also sets firewalls to permit network traffic for the virtual machine to go to the second hardware device at the hypervisor layer.

According to the present invention, the hypervisor layer provides traffic filtering and routing updating. Thus, the real switches do not need to be updated at the first and second hardware devices.

Moreover, the present invention advertises the migration of the virtual machine from the first hardware device to the second hardware device using the second hardware device. Thus, the present invention has an important advantage of not requiring central control. The routers also do not need to be updated because the migration is being advertised from the second hardware device (e.g., hardware 2).

The present invention decentralizes the updating scheme by using the hypervisor layer for security and routing. Thus, according to the present invention, preferably only two software components would be needed to be updated, whereas the conventional systems and methods would require all systems to be updated (e.g., routers, firewalls, etc. in hardware 1 and hardware 2). The present invention also is more predictable than the conventional systems and methods.

The present invention has an important advantage over the conventional systems of pushing all security and intelligence to the hypervisor level, instead of the OS level. That way, under the protection of the hypervisor, the present invention can provide traffic filtering and routing updating.

The present invention also has an important advantage in network virtualization, in which a virtual machine is to be network addressable. The present invention can provide a virtual machine that is network addressable and that does not need to migrate its entire network-entangled state.

The present invention provides an important advantage of being able to initiate migration of a virtual machine from one system to another. The present invention can provide migration of a peripheral state in which the peripheral is assumed to be a hardware resource that is emulated. The present invention also can capture an application state, such as the state of a firewall or routing that pertains to a particular movable partition. The application state can include, for example, a state of a firewall or a state of a routing that pertains to a particular movable virtual partition.

The present invention also can establish logical rules that govern the interaction of a migrated virtual machine with a network infrastructure. Thus, a logical device can be bootstrapped and a device state in the network can be easily revoked upon migration of a virtual machine partition.

The present invention can achieve these advantages, for example, as illustrated in FIG. 4, by implementing network access controls and routing controls at the hypervisor level, copying the virtual machine across the network, copying network security and routing for said virtual machine to the hypervisor layer, and storing/capturing state that is external to the processor's addressable memory, thereby moving the virtual machine from a first device to a second device. Again, according to the present invention, the virtual machine has an advantage of being able to retain the same internet protocol address.

Figure 5:
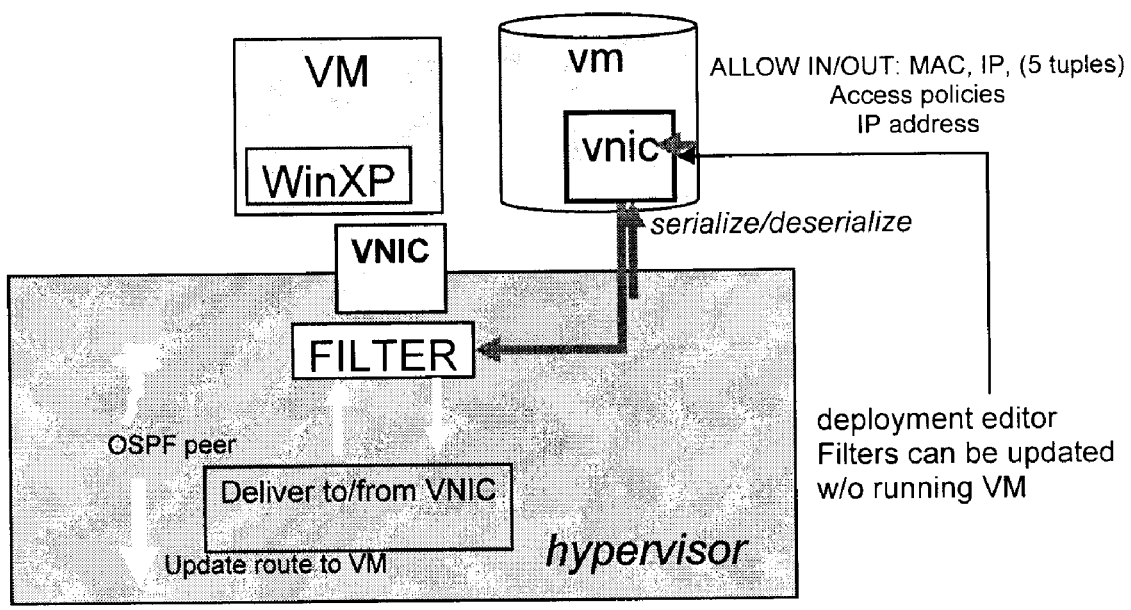
FIG. 5 illustrates an exemplary system 500, according to the present invention.

Turning to the exemplary system of FIG. 5, the present invention solves the problems with the conventional systems by preferably providing, for example, a hypervisor secured network layer (e.g., 501), as exemplarily illustrated in system 500 of FIG. 5. FIG. 5 illustrates a system that is operable to perform a method for virtual machine migration with filtered network connectivity, wherein network ACLs are stored with a serialized representation of the virtual machine.

It is noted that the operating systems running on the virtual machines cannot alter or store any state at the hypervisor layer. Thus, the hypervisor layer can be trusted and all security and intelligence can be pushed to the hypervisor level, instead of the operating system level. That way, under the protection of the hypervisor, the present invention can provide secure traffic filtering and routing updating.

Figure 6:
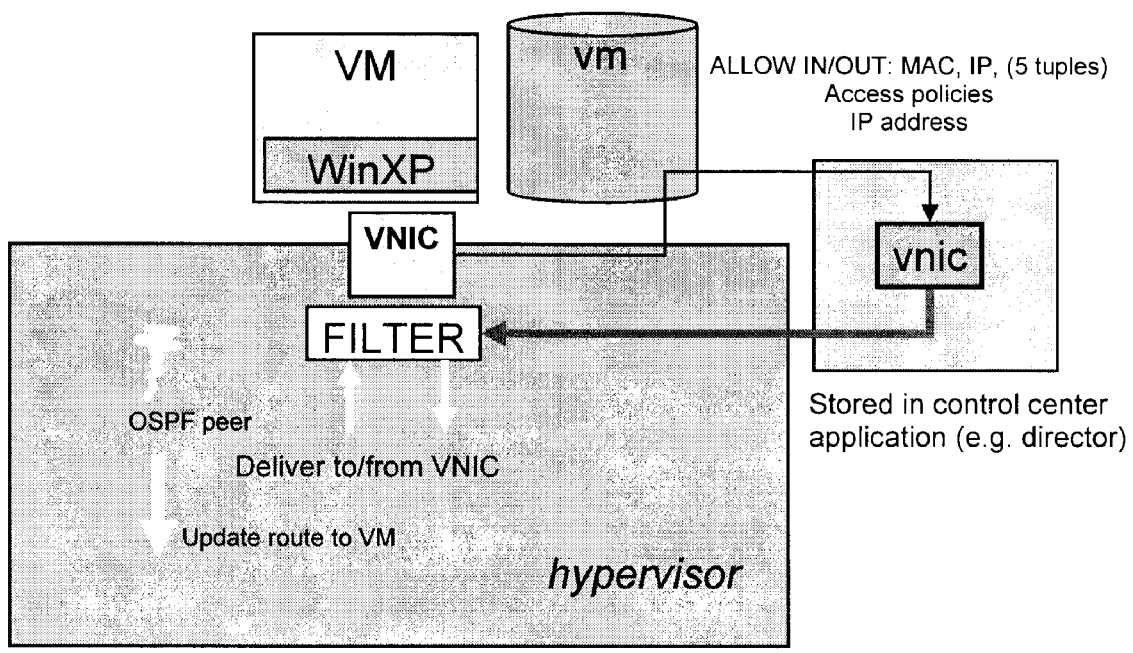
FIG. 6 illustrates another exemplary system 600, according to the present invention.

With reference, for example, to FIGS. 4-6, when the exemplary method starts out, the OSPF peer can advertise that an image (e.g., www.Ibm5.com) has moved from a first device to a second device (e.g., hardware 1 to hardware 2). The exemplary system can advertise this from hardware 2 so that there preferably is no need to have central control. Accordingly, the routers for also do not need to be updated because the migration is being advertised from the second device (e.g., hardware 2). The exemplary system can install the hardware filter rules for the image for www.ibm5.com from hardware 1 into hardware 2.

Another exemplary aspect of the invention is illustrated in FIG. 6 by the system 600. FIG. 6 illustrates a system that is operable to perform a method for virtual machine migration with filtered network connectivity, wherein network ACLs are stored in a central repository (e.g., stored in a control center application, such as a director).

The present invention has an important advantage that the ACLs are independent of the guest operating system (OS). According to the present invention, the hypervisor controls filter and serialize the images.

Thus, there are no problems or issues associated with OS versioning. Moreover, there are no complex update schemes needed for the network ACLs. The present invention also does not require the installation of ACLs in the real switches.

The present invention generally can provide security in a migrating virtual machine that is similar to security semantics of a stationary virtual machine, unless, for example, the filter layer in the hypervisor is poorly encoded.

In contrast to the conventional systems and methods, the present invention adds a network section in the Virtual machine Description file, which is stored to disk when the machine is serialized. In conventional systems, generally only the Media Access Control (MAC) is stored in this file.

The present invention also adds command line interface (CLI) to virtual switch (vSwitch) configuration in order to set and unset ACLs as well as firewall rules per vNIC.

Generally, virtual switches inside conventional hypervisors only copy packets across VNICS in an efficient manner. For example, VMotion (VMWare) explicitly requires load balancing to occur within a cluster without network-based access controls.

Other conventional systems depend on kernel integration with a hypervisor module to extend security to applications. The conventional systems and methods do not, however, address the challenges induced by executing load-balancing at a hypervisor level.

As illustrated in FIG. 5, the present invention provides a method for virtual machine migration with filtered network connectivity, wherein network ACLs are stored with a serialized representation of the virtual machine. On the other hand, as illustrated in FIG. 6, the present invention provides a method for virtual machine migration with filtered network connectivity, wherein network ACLs are stored in a central repository (e.g., stored in a control center application (e.g., a director)).

Figure 7:
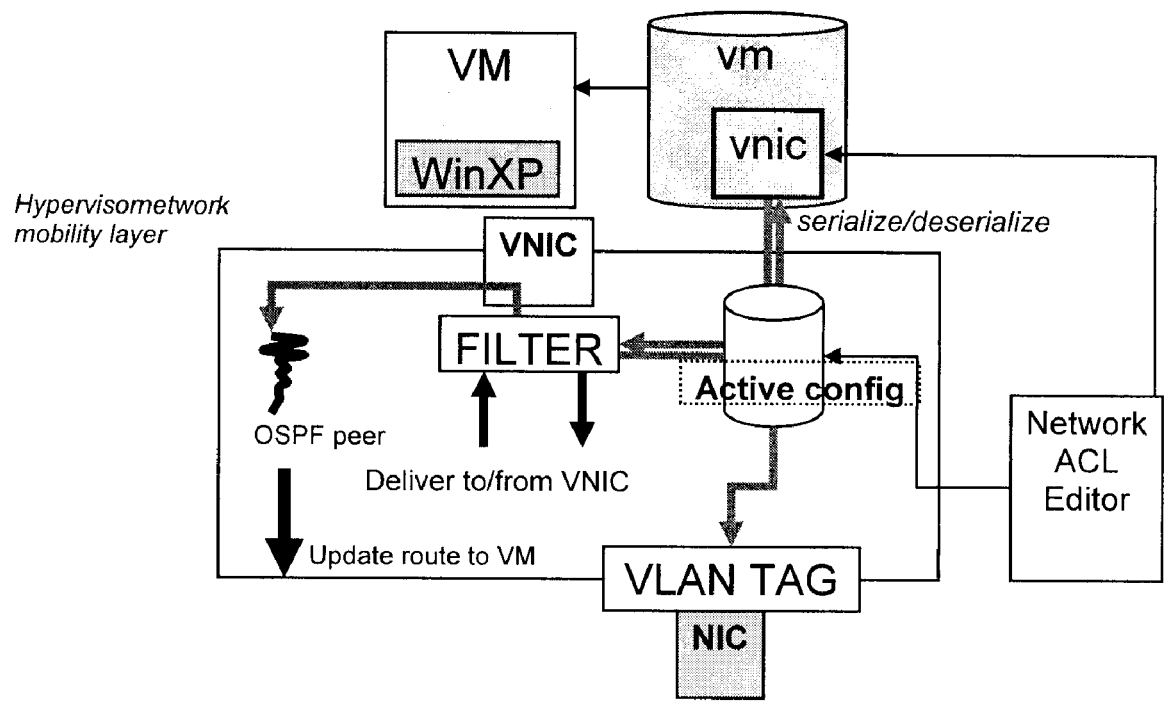
FIG. 7 illustrates another exemplary system 700, according to the present invention.

Turning now to FIG. 7, another exemplary system 700 is depicted which includes a hypervisor network mobility layer, according to the present invention.

Figure 8:
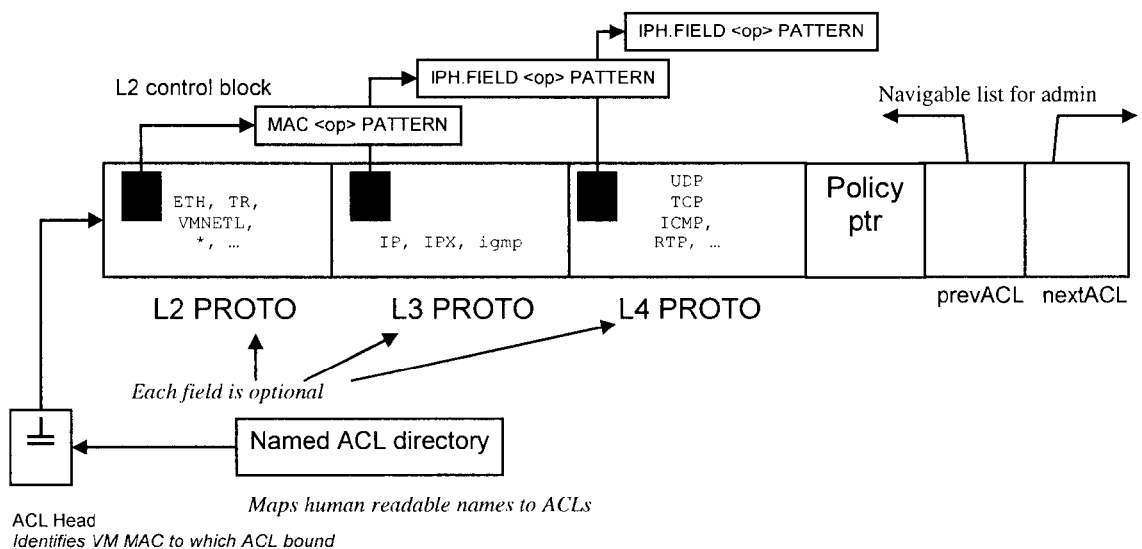
FIG. 8 illustrates an exemplary stored format 800 for hypervisor network access control lists (ACLs), according to the present invention.

FIG. 8 illustrates an exemplary stored format 800 for hypervisor network access control lists (ACLs), according to the present invention.

Figure 9:
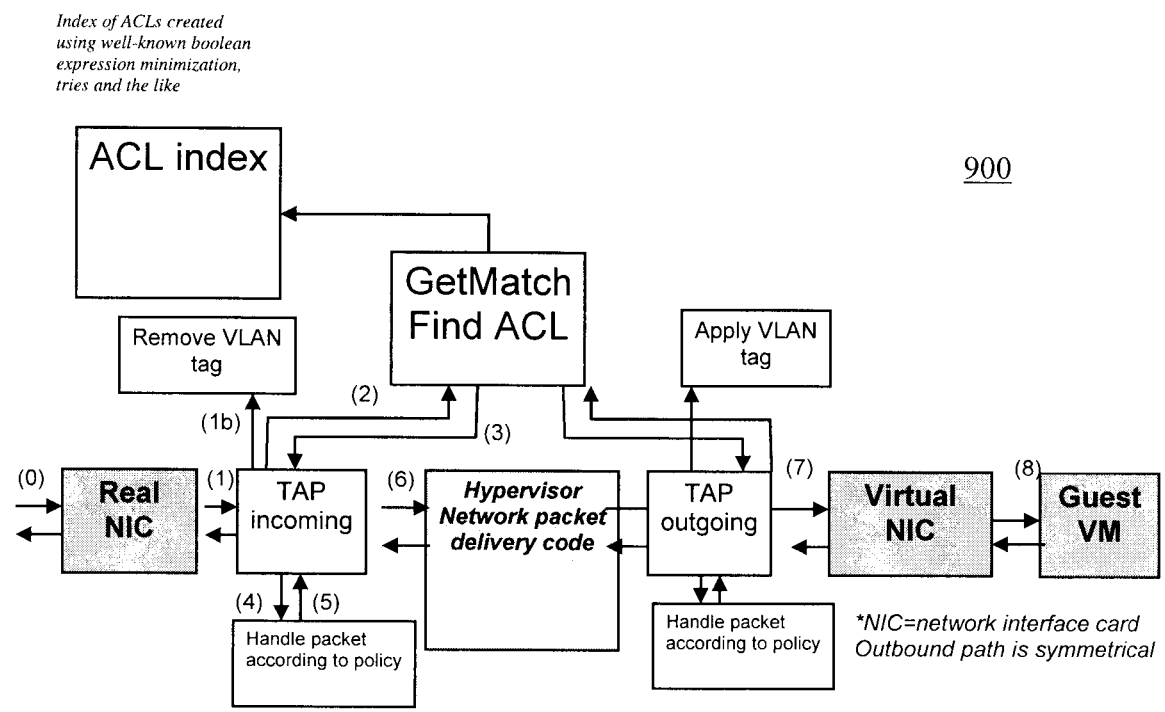
FIG. 9 illustrates another exemplary method 900 for evaluating ACLs, according to the present invention.

Turning to FIG. 9, an exemplary method 900 for evaluating access control lists (ACLs), according to the present invention, is illustrated.

Figure 10:
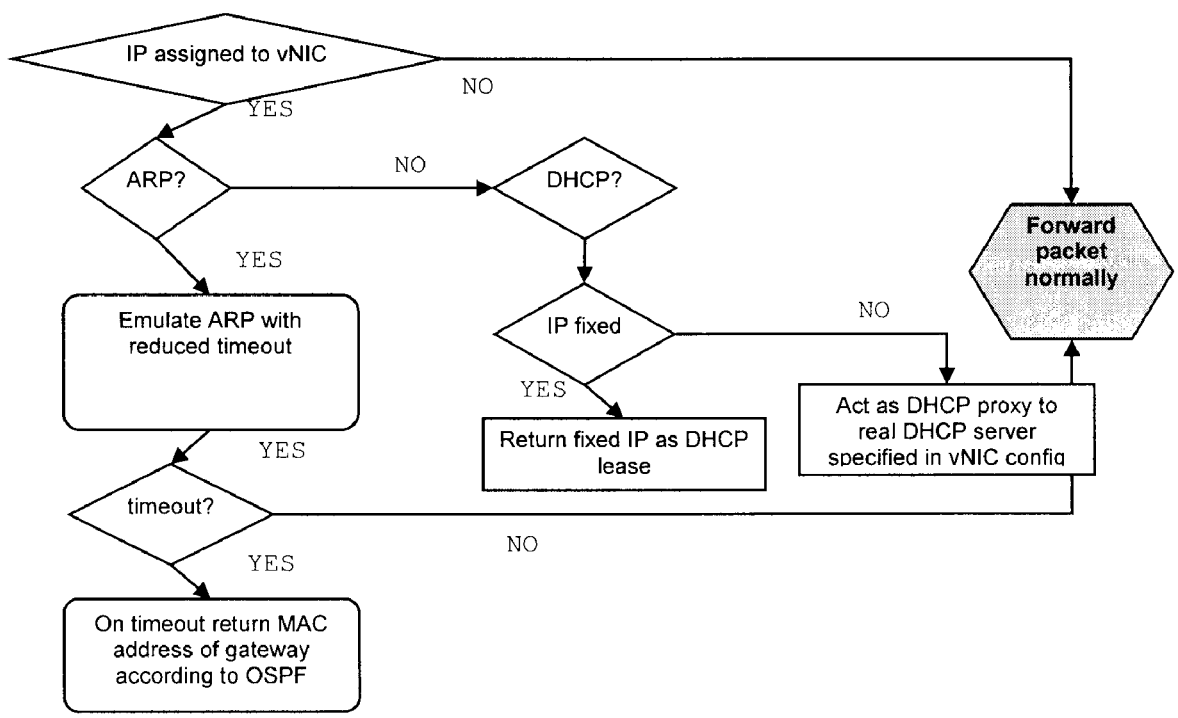
FIG. 10 illustrates another exemplary method 1000 for modified packet forwarding address resolution protocol (ARP) and dynamic host configuration protocol (DHCP) interception, according to the present invention.

FIG. 10 illustrates an exemplary method 1000 for modified packet forwarding address resolution protocol (ARP) and dynamic host configuration protocol (DHCP) interception, according to the present invention.

With reference to FIG. 10, the method first determines if an internet protocol (IP) is assigned to the vNIC (e.g. see step 1001). If not, then the method forwards the packet normally (e.g., see step 1002).

If an IP is assigned, then the method determines whether the IP is address resolution protocol (ARP) (e.g., see step 1003). If the IP is ARP, then the method emulates the ARP with reduced timeout, as illustrated in step 1004. If there is a timeout (e.g., see step 1005), then the method returns the MAC address of the gateway according to the Open Shortest Path First (OSPF) protocol (e.g., see step 1006). If there is not a timeout, then the methods acts as DHCP proxy to the real DHCP server specified in the vNIC configuration (e.g., see step 1010).

On the other hand, if the IP is not ARP, then the method determines if the IP is the Dynamic Host Configuration Protocol (DHCP)(e.g. see step 1007). The method determines if the IP is fixed (e.g. see step 1008).

If the IP is fixed, then the method returns the fixed IP as DHCP lease (e.g., see step 1009).

If the IP is not fixed, then the methods acts as DHCP proxy to the real DHCP server specified in the vNIC configuration (e.g., see step 1010). The packet is then forwarded normally (e.g., see step 1002).

Figure 11:
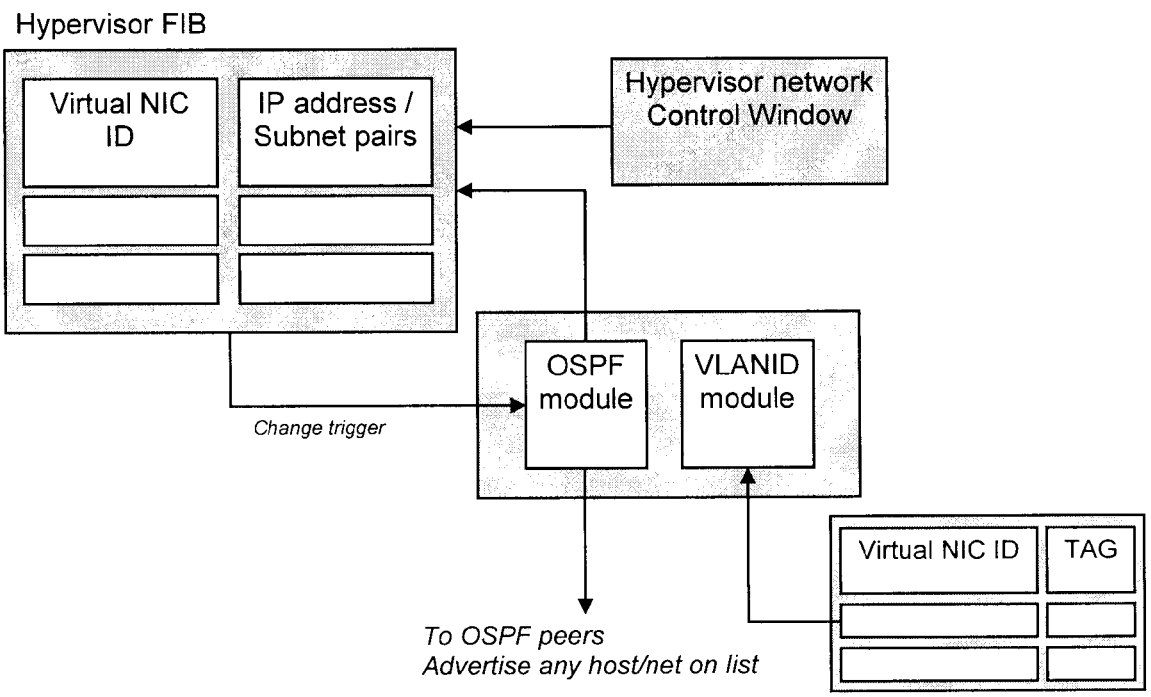
FIG. 11 illustrates another exemplary system 1100, according to the present invention.

Turning now to FIG. 11, another exemplary system 1100, according to the present invention, illustrates re-connect storing per virtual machine port routing and VLANs. The system 1100 includes hypervisor FIB (1110) including virtual NIC ID (e.g., 1115) and IP address/subnet pairs (e.g., 1120). The system 1100 further includes a hypervisor network control window (1125), OSPF module (1130) and VLANID module (1135). The VLANID module (1135) can include virtual NIC ID (1140) and TAG (1145).

Figure 12:
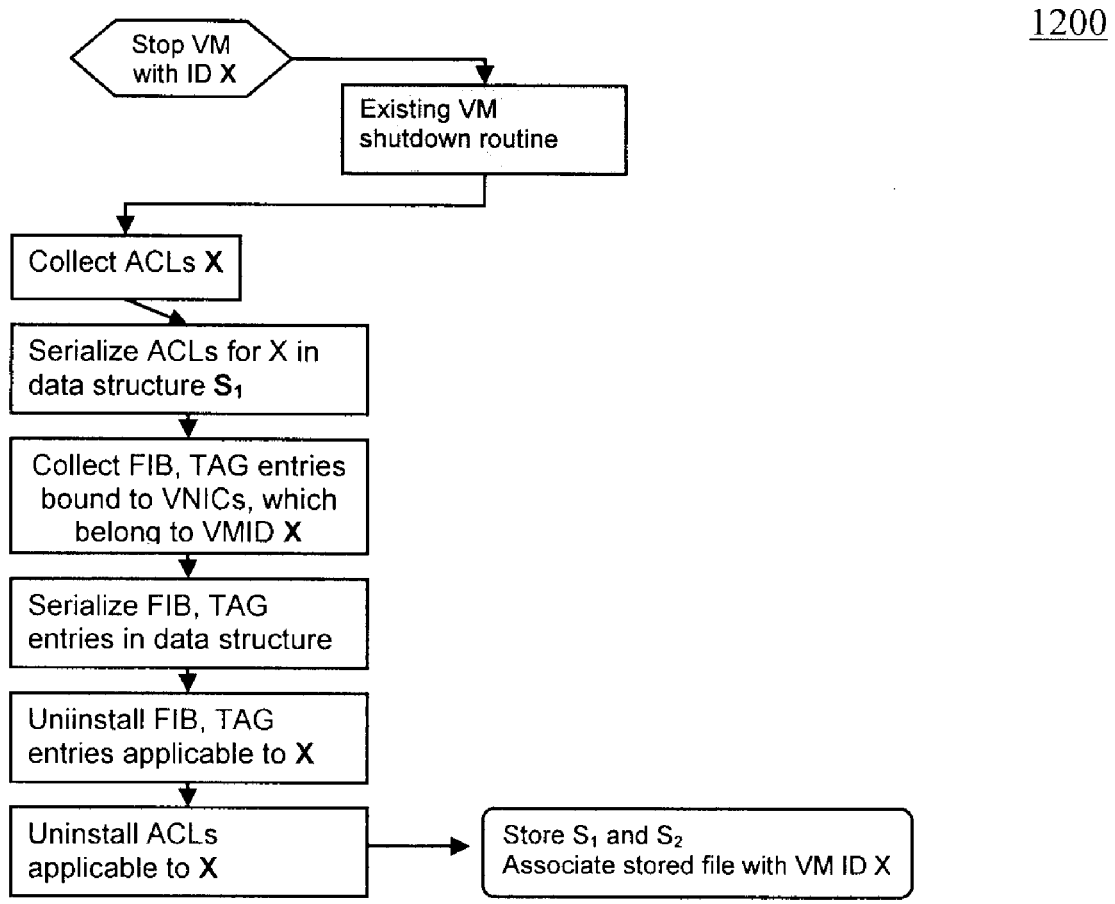
FIG. 12 illustrates an exemplary method 1200 for modified virtual machine suspend/stop, according to the present invention.

FIG. 12 illustrates an exemplary method 1200 for modified virtual machine suspend/stop, according to the present invention. As shown in FIG. 12, the exemplary method includes a step 1201 in which the virtual machine having a predetermined ID (e.g., ID X) is stopped. In step 1202, the existing virtual machine shutdown routine is performed. Step 1203 illustrates collecting ACLs for X. Next, the method serializes ACLs for X in data structure $S_1$ (e.g., see step 1204).

The exemplary method then collects FIB and TAG entries bound to VNICs, which belong to VMID X (e.g., see step 1205). In step 1206, the method serializes FIB and TAG entries in the data structure. The method then uninstalls FIB and TAG entries applicable to X (e.g. see step 1207), and uninstalls ACLs applicable to X (e.g. see step 1208). The exemplary method then stores $S_1$ and $S_2$ and associates the stored file with virtual machine ID X (e.g. see step 1209).

Figure 13:
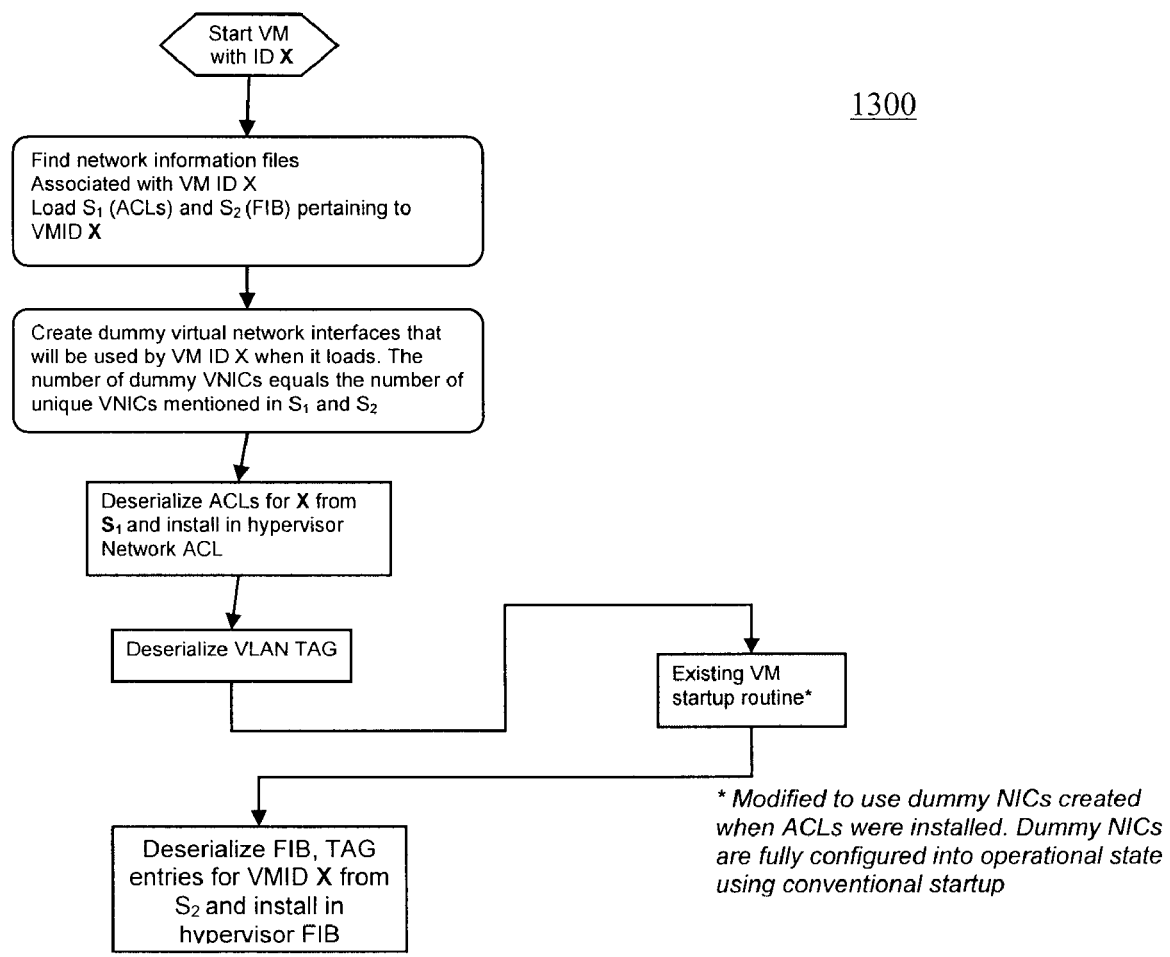
FIG. 13 illustrates an exemplary method 1300 for a modified virtual machine start sequence, according to the present invention.

FIG. 13 illustrates an exemplary method 1300 for a modified virtual machine start sequence, according to the present invention.

As illustrated in FIG. 13, the exemplary method starts the virtual machine VM with ID X (e.g., see step 1301). Next, the method finds network information files associated with VM ID X and loads $S_1$ (ACLs) and $S_2$ (FIB) pertaining to virtual machine ID X (e.g. see step 1302). The method creates dummy virtual network interfaces that can be used by virtual machine ID X when it loads (e.g. see step 1303). The number of dummy VNICs preferably is equal to the number of unique VNICs mentioned in S1 and S2.

The method then deserializes ACLs for X from $S_1$ and installs them in hypervisor Network ACL (e.g., see step 1304). The method further deserializes the VLAN TAG (e.g. see step 1305). As illustrated at step 1306, the existing virtual machine startup routine is performed. It is noted that the existing virtual machine startup routine preferably is modified to use dummy NICs created when the ACLs were installed. Dummy NICs preferably are fully configured into the operational state using conventional startup.

The exemplary method then deserializes FIB and TAG entries for virtual machine ID X from $S_2$ and installs them in hypervisor FIB (e.g., see step 1307).

Figure 14:
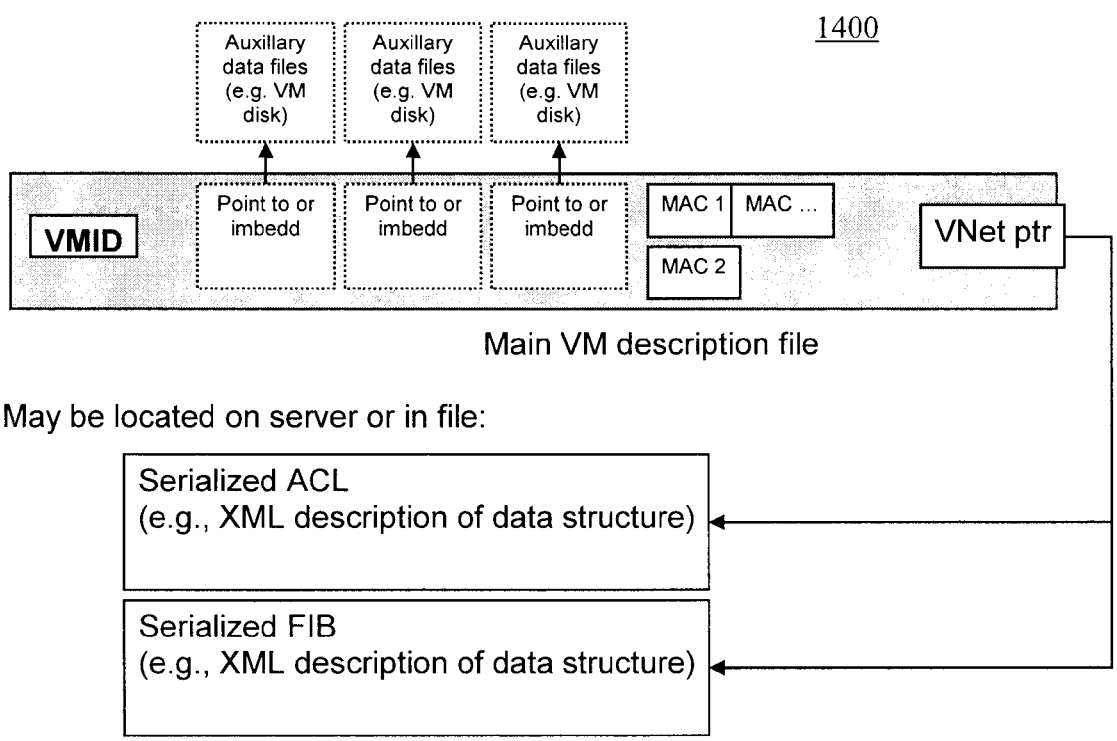
FIG. 14 illustrates another exemplary system 1400 for storing virtual machine-specific ACLs and FIB information, according to the present invention.

FIG. 14 illustrates an exemplary system 1400 for storing virtual machine-specific ACLs and FIB information, according to the present invention.

As exemplarily illustrated in FIG. 14, the main virtual machine VM description file (1401) can include virtual machine ID (1402), point to or imbed (1403, 1404, 1405), which can include auxiliary data files (e.g., VM disk) (e.g., see 1407, 1408, 1409), MAC 1, MAC 2, . . . MAC N (e.g., 1406), and VNet ptr (1410).

The VNet ptr can include Serialized ACL (1411) (e.g., extensible markup language (XML) description of data structure) and/or Serialized FIB (1412) (e.g., XML description of data structure), which can be located on the server or in a file.

Figure 15A:
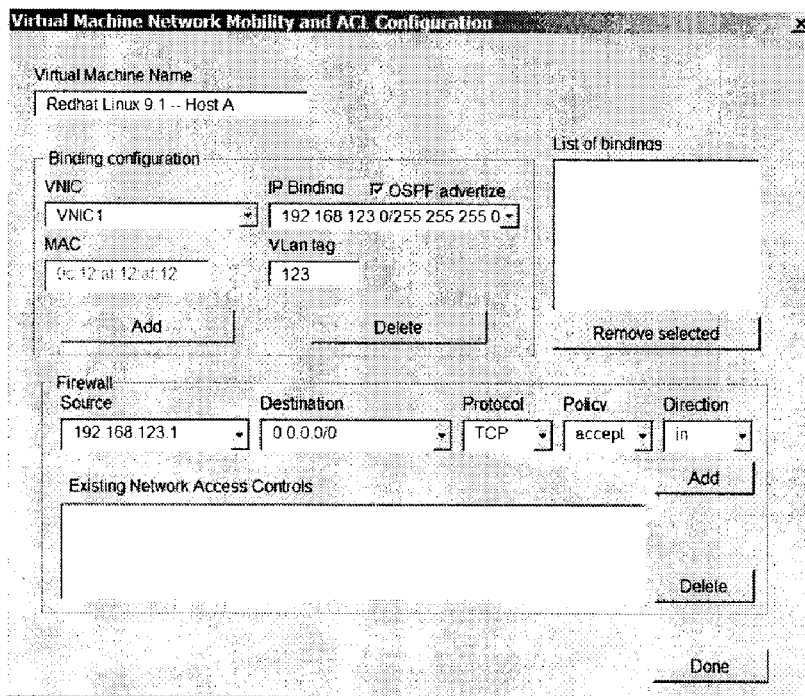
FIG. 15A illustrates an exemplary graphic user interface (GUI) 1500 for a virtual machine network console for ACL and forwarding information base (FIB) configuration, according to the present invention.

FIG. 15A illustrates an exemplary graphic user interface (GUI) 1500 for a virtual machine network console for ACL and FIB configuration, according to the present invention.

Figure 15B:
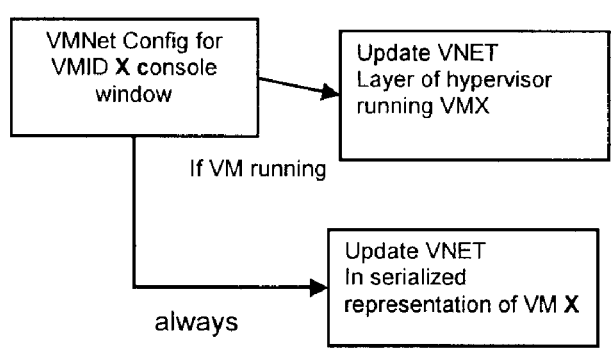
FIG. 15B illustrates an exemplary method 1501.

As FIG. 15B illustrates an exemplary method 1501 in which virtual machine Net configuration (VMNet Config) for virtual machine ID X console window (e.g. see 1505) includes updating VNET layer of the hypervisor running virtual machine X, preferably when the virtual machine is running (e.g., see step 1506), and preferably always updating VNET in serialized representation of virtual machine X (e.g., see step 1507).

Figure 16:
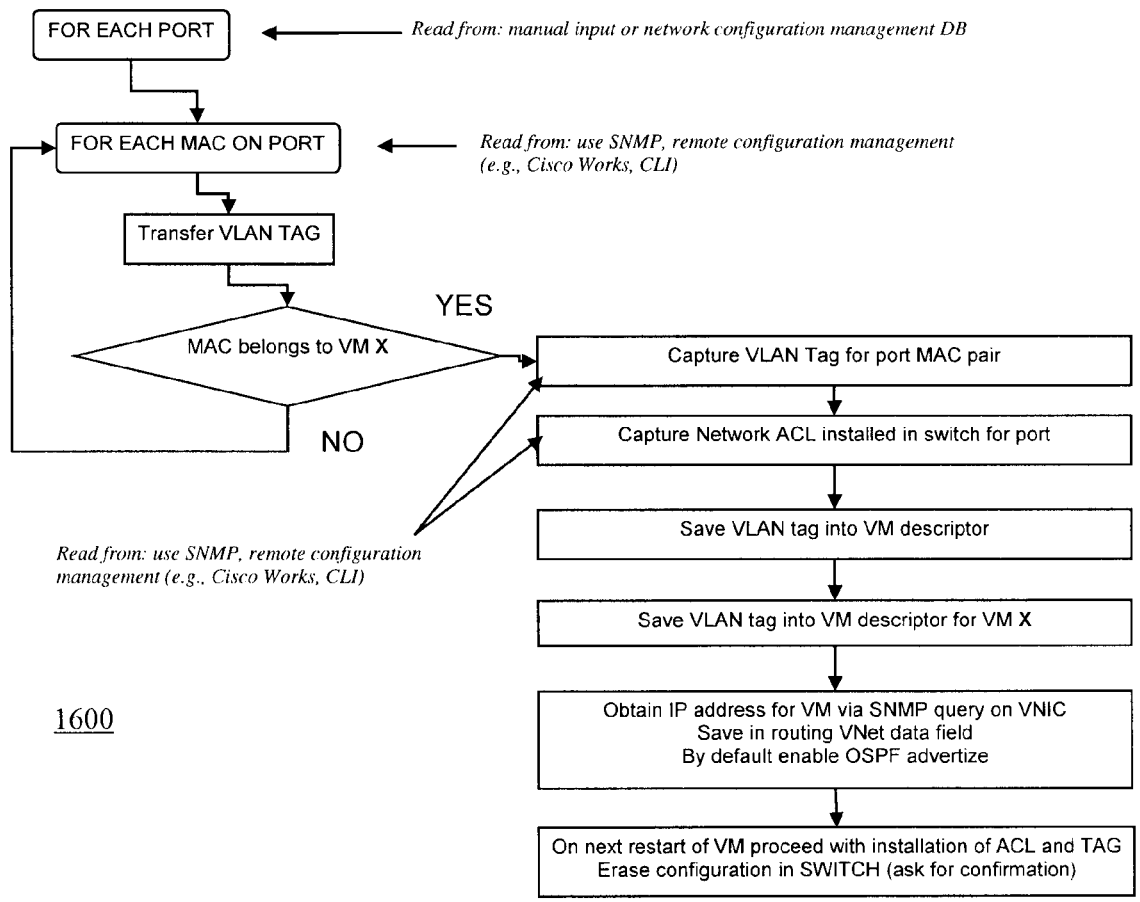
FIG. 16 illustrates a preferred exemplary method 1600 for moving existing switch configuration regarding one virtual machine attachment into the hypervisor network layer, according to the present invention.

FIG. 16 illustrates a preferred exemplary method 1600 for moving existing switch configuration regarding one virtual machine attachment into the hypervisor network layer, according to the present invention. The ordinarily skilled artisan would understand that the exemplary method of FIG. 16 is not required in the present invention.

As illustrated in FIG. 16, for each port, the method reads from manual input or a network configuration management database (e.g., see step 1601). For each MAC on the port (e.g., see step 1602), the method then reads from use Simple Network Management Protocol (SNMP), remote configuration management (e.g., Cisco Works, CLI, etc.) and transfers VLAN TAG (e.g., see step 1603).

The method determines if the MAC belongs to virtual machine X (e.g., see step 1604). If not, then the method returns to step 1602 and, for each MAC on the port, reads from use SNMP, remote configuration management (e.g., Cisco Works, CLI), etc.

If the MAC belongs to the virtual machine X, then the method captures the VLAN Tag for the port MAC pair by, for example, reading from use SNMP, remote configuration management (e.g., Cisco Works, CLI), etc. (e.g., see step 1605).

Next, the method captures the Network ACL installed in the switch for the port, for example, by reading from use SNMP, remote configuration management (e.g., Cisco Works, CLI), etc. (e.g., see step 1606).

The method then saves the VLAN tag into the virtual machine VM descriptor (e.g., see step 1607), saves the VLAN tag into the virtual machine VM descriptor for virtual machine X (e.g., see step 1608), and obtains the IP address for the virtual machine VM via an SNMP query on the VNIC, saves in routing VNet data field, and by default enables the OSPF advertise (e.g., see step 1609).

On the next restart of the virtual machine, the exemplary method proceeds with the installation of the ACL and TAG, erases the configuration in the SWITCH (and preferably, asks for confirmation) (e.g., see step 1610).

Figure 17:
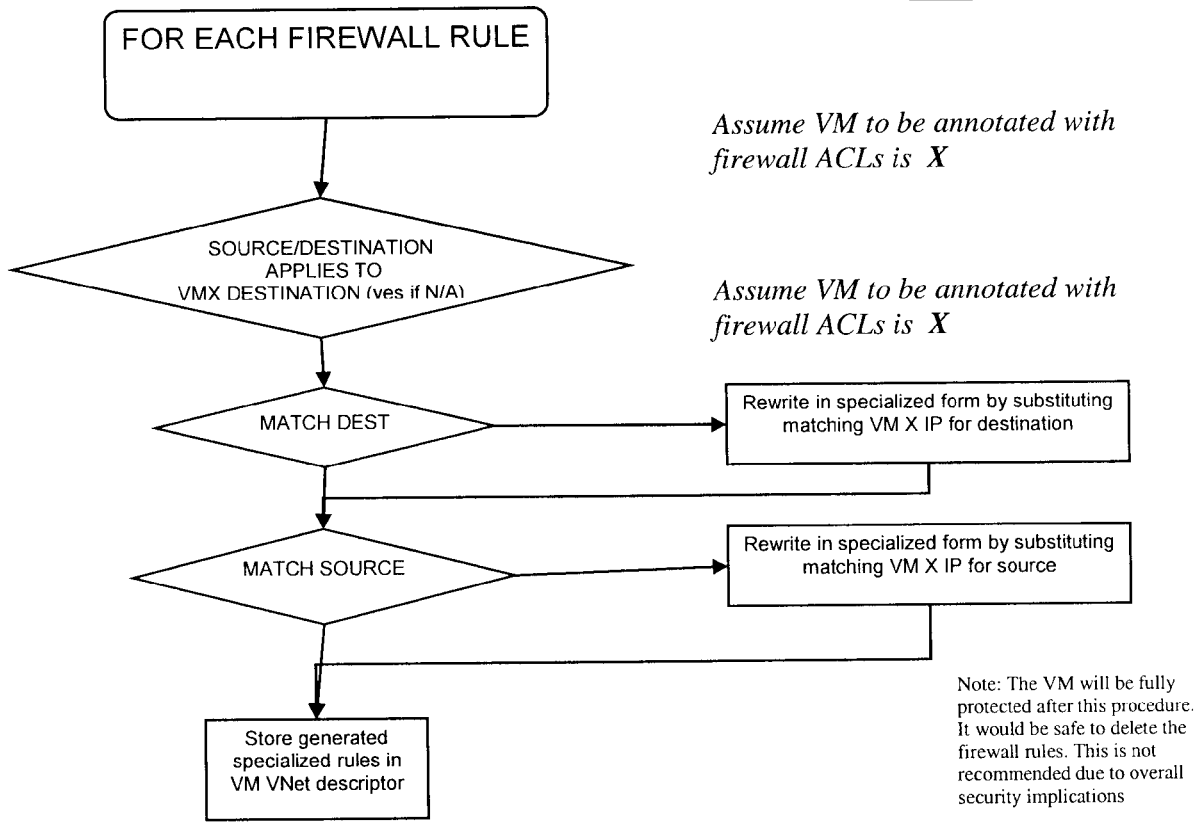
FIG. 17 illustrates a preferred exemplary method 1700 for moving firewall rules for a virtual machine into the hypervisor network layer, according to the present invention.

Turning to FIG. 17, FIG. 17 illustrates a preferred exemplary method 1700 for moving firewall rules for a virtual machine into the hypervisor network layer, according to the present invention. For purposes of describing the exemplary method of FIG. 17, the virtual machine X is assumed to be annotated with firewall ACLS. Also, virtual machine X is assumed to be annotated with firewall ACLs.

As illustrated in FIG. 17, for each firewall (e.g., see step 1701), the exemplary method determines if the source/destination applies to virtual machine X.

Next, the method matches the destination (e.g., step 1703) and rewrites in specialized form by substituting matching virtual machine X IP for the destination (e.g., step 1706).

The method then matches the source (e.g., see 1704) and rewrites in specialized form by substituting matching virtual machine X IP for source (e.g. see 1707).

The method stores the generated specialized rules in the virtual machine VNet descriptor (e.g., see step 1705). It is noted that the virtual machine preferably will be fully protected after this procedure.

The exemplary method and system of the present invention can provide control of network security of a virtual machine by enforcing network security and routing at a hypervisor layer at which a virtual machine partition is executed and which is independent of guest operating systems.

The exemplary aspects of the present application preferably can provide a hypervisor security architecture designed and developed to provide a secure foundation for server platforms, providing numerous beneficial functions, such as, strong isolation, mediated sharing and communication between virtual machines. These properties can all be strictly controlled by a flexible access control enforcement engine, which also can enforce mandatory policies. The exemplary features of the invention also can provide attestation and integrity guarantees for the hypervisor and its virtual machines.

Applicants also have recognized that several alternatives to the preferred aspects of the present invention.

For example, one alternative would by MAC sharing in which all VNICs on the same real NIC share a MAC, with hypervisor demux being provided by IP. However, this would not provide the desired mobility.

Another alternative would be to provide ACL in the guest OS (i.e., ZoneAlarm integrity). However, such would undesirably require reliance on a possibly compromised guest OS that would be hosted on behalf of a customer.

As another alternative, the ACLs could be updated in network infrastructure. However, this method generally is too messy, slow and likely would result in difficult compatibility problems. That is, updating the ACLs in the network infrastructure likely would lead to numerous and complex failures.

Another alternative would be to run the router thread and firewall within dedicated network services VM partition. However, this alternative generally would require four more data copies. Also, this alternative would require a messy protocol for updating the routers, DHCP update, etc. across two remote partitions.

The present invention could be detected in systems by referring to product literature. Also, the present invention could be detected in systems by installing a predetermined OS on the hypervisor and then blocking all policy updates on the individual switches.

Figures 18, 19:
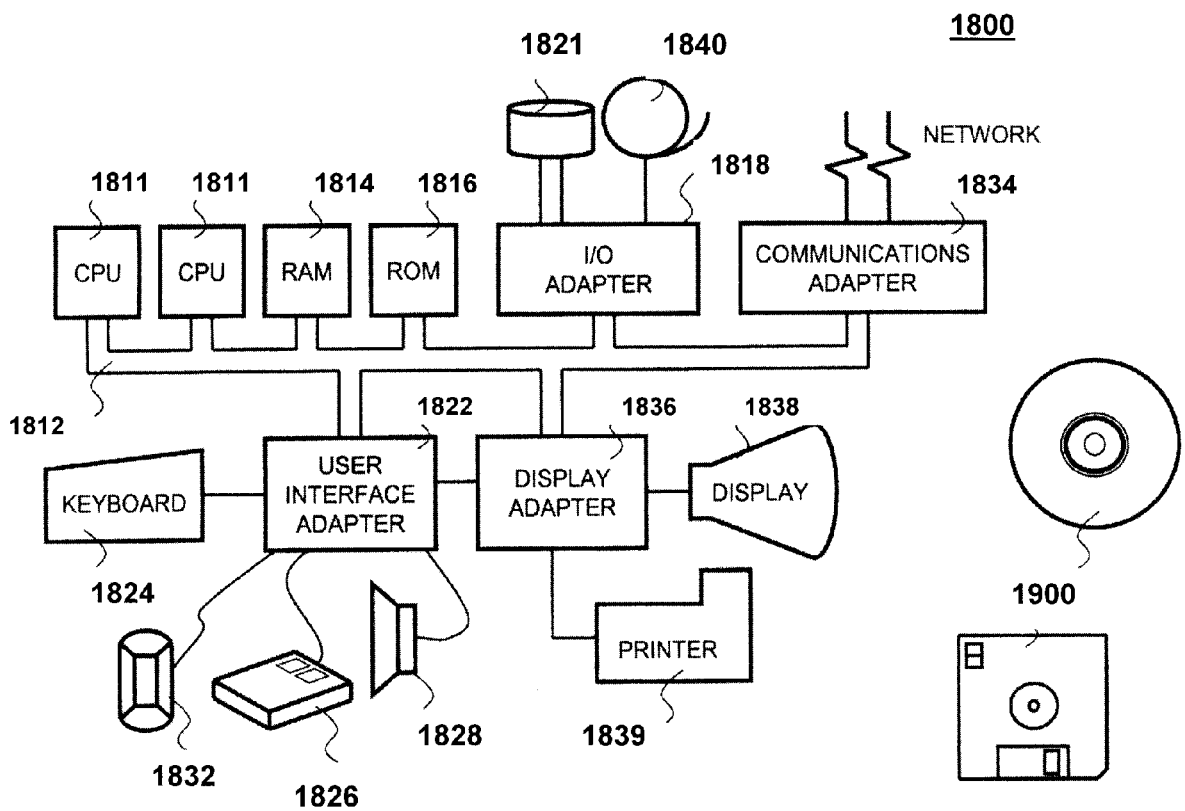
FIG. 18 illustrates an exemplary hardware/information handling system 1800 for incorporating the present invention therein.
FIG. 19 illustrates a signal bearing medium 1900 (e.g., storage medium) for storing steps of a program of a method according to the present invention.

FIG. 18 illustrates a typical hardware configuration of an information handling/computer system for use with the invention and which preferably has at least one processor or central processing unit (CPU) 1811.

The CPUs 1811 are interconnected via a system bus 1812 to a random access memory (RAM) 1814, read-only memory (ROM) 1816, input/output (I/O) adapter 1818 (for connecting peripheral devices such as disk units 1821 and tape drives 1840 to the bus 1812), user interface adapter 1822 (for connecting a keyboard 1824, mouse 1826, speaker 1828, microphone 1832, and/or other user interface device to the bus 1812), a communication adapter 1834 for connecting an information handling system to a data processing network, the Internet, an Intranet, a personal area network (PAN), etc., and a display adapter 1836 for connecting the bus 1812 to a display device 1838 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 1811, as represented by the fast-access storage for example. Alternatively, the instructions may be contained in another signal-bearing media, such as a magnetic data storage or CD-ROM diskette 1900 (FIG. 19), directly or indirectly accessible by the CPU 1811.

Whether contained in the diskette 1900, the computer/CPU 1811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless.

In an illustrative embodiment of the invention, the machine-readable instructions may comprise software object code, compiled from a language such as "C", etc.

Additionally, in yet another aspect of the present invention, it should be readily recognized by one of ordinary skill in the art, after taking the present discussion as a whole, that the present invention can serve as a basis for a number of business or service activities. All of the potential service-related activities are intended as being covered by the present invention.

While the invention has been described in terms of several exemplary aspects, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A computer implemented method of controlling network security of a virtual machine, the method comprising enforcing network security and routing at a hypervisor layer via dynamic updating of routing controls initiated by a migration of said virtual machine from a first device to a second device.

2. The method according to claim 1, further comprising:
   routing traffic for the virtual machine to the second device at the hypervisor layer; and
   setting firewalls to permit a network traffic for the virtual machine to go to the second device at the hypervisor layer.

3. The method according to claim 1, further comprising:
   copying network security and routing for said virtual machine to said hypervisor layer;
   migrating said virtual machine from a first hardware device to a second hardware device.

4. The method according to claim 3, further comprising:
   updating routing controls for said virtual machine at the hypervisor level;
   updating traffic filters for said virtual machine at the hypervisor level; and
   advertising said migration of said virtual machine from said first hardware device to said second hardware device.

5. The method according to claim 1, further comprising setting firewalls to permit network traffic for the virtual machine to go to the second hardware device at the hypervisor layer.

6. The method according to claim 1, further comprising adding a network section to a Virtual Machine Description File.

7. The method according to claim 1, further comprising storing network access control lists.

8. The method according to claim 7, further comprising adding a command line interface to a Virtual Switch configuration to set and unset a respective one of the access control lists.

9. A system for virtual machine migration with filtered network connectivity and controlling network security of a virtual machine by enforcing network security and routing at a hypervisor layer, said system comprising:
   a copying unit that copies network security and routing for said virtual machine to said hypervisor layer;
   a migrating unit that migrates said virtual machine from a first hardware device to a second hardware device;
   a first updating unit that updates routing controls for said virtual machine at the hypervisor level;
   a second updating unit that updates traffic filters for said virtual machine at the hypervisor level; and
   an advertising unit that advertises said migration of said virtual machine from said first hardware device to said second hardware device.

10. The system of claim 9, further comprising:
    a router that routes network traffic for said virtual machine to said second hardware device based on said routing controls; and
    a filter that grants access to said virtual machine on said second hardware device based on said traffic filters.

11. The system according to claim 9, wherein said second hardware device includes said advertising unit.

12. The system according to claim 9, wherein said first updating unit dynamically updates routing controls initiated by said migration of said virtual machine from the first device to the second device.

13. The system according to claim 9, wherein said second updating unit dynamically controls firewall network access initiated by said migration of said virtual machine from said first device to said second device.

14. The system according to claim 9, further comprising a logical rule unit that establishes logical rules that govern an interaction of said migrated virtual machine with a network infrastructure.

15. The system according to claim 9, further comprising a storage unit for storing network access control lists, said network access control lists comprising a serialized representation of the virtual machine in a central repository.

16. The system according to claim 9, further comprising a storage unit that stores a virtual machine description file when said virtual machine is serialized, said virtual machine description file including a network section and a media access control file.

17. The system according to claim 9, wherein said hypervisor layer includes a hypervisor at which a virtual machine partition is executed.

* * * * *